June 25, 1929.   E. P. MARS   1,718,827
ARTIFICIAL STONE
Filed Oct. 17, 1925
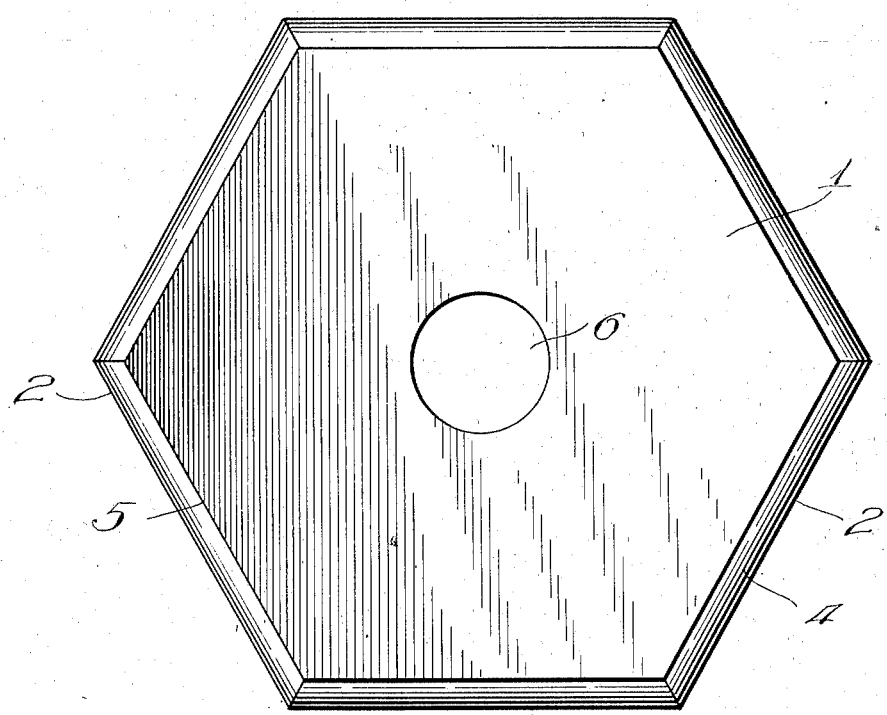
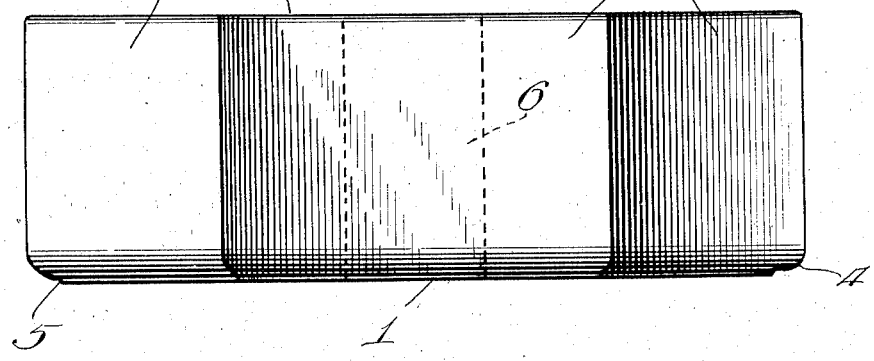
Inventor:
Ernst P. Mars
by Wallace R. Lane.
Atty Patented June 25, 1929.

1,718,827

UNITED STATES PATENT OFFICE.

ERNST P. MARS, OF CHICAGO, ILLINOIS, ASSIGNOR TO TRIBUNE COMPANY, OF CHICAGO, ILLINOIS, A CORPORATION OF ILLINOIS.

ARTIFICIAL STONE.

Application filed October 17, 1925. Serial No. 63,179.

The present invention relates to the art of grinding and polishing stones and the like.

Among the objects of the invention is to provide a novel grinding and polishing stone of fine and homogeneous texture especially adapted for grinding and polishing surfaces of metal, such as etched cylinders of printing presses and the like. Heretofore, fine stones for this purpose, were quarried but the texture of the quarried stone varies in hardness, often being hard and soft in spots, and also are usually stratified with different ingredients and with different degrees of hardness. The present invention comprehends the idea of making the stone synthetically and with a homogeneous and uniform texture and hardness so that the effects of grinding and polishing will be unvaried and more efficient than is possible with natural stones.

The invention also comprehends the particular composition of the stones, as well as the article itself and the method of making the same.

Other objects, advantages and capabilities are comprehended by the invention as will later appear and are inherently possessed by the invention.

Referring to the drawings illustrating a stone produced in accordance with the invention, Figure 1 is a bottom plan view of such a stone, and Figure 2 is a view in elevation thereof.

In the illustrative embodiment of the invention, the stone is, in the specific case, made from the following ingredients in the proportions by weight of 80 parts of lead oxide or litharge, preferably in the powdered form, 40 parts of tripoli or tripoli powder, 8 parts of rotten stone, preferably in powdered form, 2 parts of brown sugar and 29 parts of glycerine, preferably white glycerine.

In the process of producing this stone, the litharge, tripoli and rotten stone are preferably separately sifted through a suitable sieve, preferably of 300 mesh, and then weighed out in the desired proportions and then mixed together dry.

The glycerine and brown sugar may be then mixed together by dissolving the sugar in the glycerine which is preferably of a specific gravity of about 1240 at 70° Fahrenheit. This solution is then added to the dry mixture above mentioned and thoroughly mixed therewith. The mixing may be effected in a mixer wherein the substances may be thoroughly stirred and blended and forced through a screen or sieve to prevent or remove lumps and spots.

The resultant mass is then supplied or fed, as by a trowel or other means to molds of desired shape. A convenient form is that of a flat hexagon. The molded mass is then permitted to air dry in the mold for a suitable length of time, such as two hours, and then taken from the mold and permitted to further dry in the air for a few more hours, such as from six to eight hours. The stone is then in condition to be put into use.

Such a stone is shown in the drawings and is of hexagon shape and having a working surface 1, sides 2 and back 3, the sides and working surface meeting in rounded corners or beading or edges 4, and a shoulder 5 which is of aid in initiating the grinding and polishing action. In the center of the stone may also be provided an aperture 6 for permitting of the working of the worn away particles of the stone during the grinding operation, such particles being capable of working toward the aperture 6 where they may be released, and also toward the edges or shoulders 5 where they are also relieved at the polygonal edge of the stone.

The stone, in use, may be suitably mounted in a holder or the like which is rotatable and oscillable so that the surface 1 may be presented to the surface to be ground and polished and at the same time effect a relative rotatory and oscillatory motion. When grinding, water is generally used so that the cutting or polishing action may be more efficient, and the particles breaking away from the stone will work their way toward the aperture 6 or the edge of the stone. By making the stone non-circular aids in that the holder may positively rotate the stone and avoid any slippage that might occur if the stone were circular.

While I have herein described a particular composition and process of making the stone and a particular structure of the stone, as well as shown the latter upon the drawing, it is to be understood that the invention is not limited thereto but also comprehends other compositions, methods of producing and other constructions, without departing from the spirit of the invention.

Having thus disclosed my invention, I claim:

1. A composition for grinding and polishing, comprising a mixture of a tripoli powder with litharge and glycerine.

2. A composition for grinding and polishing, comprising litharge, rotten stone and glycerine.

3. A composition for grinding and polishing, comprising a mixture of siliceous substance with litharge, rotten stone and glycerine.

4. A composition for grinding and polishing, comprising in the proportions by weight of eight parts of rotten stone, forty parts of tripoli powder, twenty-nine parts of glycerine and eighty parts of litharge.

5. A composition for grinding and polishing, comprising a mixture of powdered litharge, tripoli powder, powdered rotten stone, brown sugar and white glycerine.

6. A composition for grinding and polishing, comprising a mixture of tripoli powder (consisting chiefly of silica), a diluent substance, and a binding agent, said mixture forming a stone usable for grinding and polishing copper cylinders used in intaglio printing.

7. A composition for grinding and polishing, comprising a mixture of litharge, tripoli, brown sugar, and glycerine.

In witness whereof, I hereunto subscribe my name to this specification.

ERNST P. MARS.